United States Patent [19]

Piltingsrud et al.

[11] Patent Number: 4,567,096

[45] Date of Patent: Jan. 28, 1986

[54] HYDRATED ALUMINA BINDER SYSTEM

[76] Inventors: Douglas H. Piltingsrud; John C. S. Shen, both of Rochester, Minn.

[21] Appl. No.: 714,331

[22] Filed: Mar. 21, 1985

[51] Int. Cl.$^4$ ................................................. G11B 5/70
[52] U.S. Cl. .............................. 428/315.5; 252/62.54; 360/134; 360/135; 360/136; 427/128; 428/315.9; 428/317.1; 428/317.7; 428/329; 428/694; 428/695; 428/900; 428/425.9
[58] Field of Search ........... 428/329, 694, 695, 425.9, 428/323, 422, 900, 447, 315.5, 315.9, 317.1, 317.7; 427/44, 128; 252/62.54; 360/134–136

[56] References Cited

U.S. PATENT DOCUMENTS

| | | | |
|---|---|---|---|
| 4,135,016 | 6/1979 | Ogawa | 428/337 |
| 4,404,238 | 9/1983 | Baldwin | 428/329 |
| 4,405,684 | 9/1983 | Blumentritt | 428/425.9 |
| 4,410,440 | 10/1983 | Ito | 428/425.9 |
| 4,510,203 | 4/1985 | Ogawa | 428/425.9 |

Primary Examiner—Ellis P. Robinson
Attorney, Agent, or Firm—Robert W. Lahtinen

[57] ABSTRACT

The composition and method of making a magnetic recording media using a polyurethane binder system with high lubricant retention and a high concentration of magnetic particles is described. The use of hydrated alumina with a solvent blocked isocyanate is used to produce an open cell microporosity in the cured coating wherein the individual voids are not greater than the magnetic bit cell size and the alumina particles remain in the coating to improve abrasion resistance. The porosity size is controlled by a surface active agent additive. Also shown is the method of preparing hydrated alumina with small particle size, dispersibility, and compatibility, and wherein the dehydrating temperature has the same range as the isocyanate deblocking temperature whereby the $CO_2$ formation that creates the porosity occurs as the polyurethane components cure.

6 Claims, No Drawings

HYDRATED ALUMINA BINDER SYSTEM

BACKGROUND OF THE INVENTION

The present invention relates to the method of enhancing durability of magnetic recording disks and more particularly to an improved magnetic binder system that is capable of forming a very thin, microporous, error-free magnetic disk coating.

Today, the recording density of rigid magnetic data recording disks has been increased significantly. This is due to technical improvement, such as reduction of head flying height and magnetic film thickness and an increase in the coercivity of the medium. However, such technical achievements are unavailing if the coating does not achieve higher levels of mechanical durability under a low head flying height at a substantial velocity. Thus, development of a magnetic recording medium with increased wear-resistance and a lower coefficient of friction becomes progressively more important.

Generally, the mechanical durability of the magnetic recording medium depends upon the surface lubricant and wear particles which are introduced into the coating to increase abrasion resistance. However, improvement in signal to noise ratio at higher recording densities necessitates a reduction of the quantity and size of wear particles. Therefore, the lubrication technique becomes more important to assure adequate durability for high density recording.

Difficulties in lubrication arise from the fact the too much surface lubricant causes a head-to-disk adhesion and too little leads to insufficient durability. Both lead to "head crash". The key factor in improving the magnetic disk durability through lubrication is to apply as much lubricant as possible without causing head-to-disk adhesion.

One alternative technology is to absorb the liquid lubricant into the magnetic coating layer and gradually disperse the lubricant to the surface as the medium is used.

SUMMARY OF THE INVENTION

The principle object of the present invention is to enhance the lube retention of rigid polyurethane coated magnetic disks and to assure not only adequate long term durabililty, but also low noise and bit-error characteristics.

Another object of the present invention is to provide a magnetic recording surface having excellent lubricity, a reduced coefficient of head friction and steady running properties.

Still another object of the present invention is to provide a magnetic recording disk surface which is able to prevent liquid lubricant spin-off under high rotational velocities.

U.S. Pat. No. 4,405,684 shows a polyurethane magnetic coating binder composition containing a blocked isocyanate, a polyol and a dispersant with magnetic particles surfactant, catalyst and solvents. The composition yields a very smooth disk coating surface, but one low in surface micro-porosity. This results in a low lubricant retention. In the present invention, the modified polyurethane binder system has enhanced microporosity, and the capability to retain 2 to 5 times more liquid lubricant without causing a head to disk adhesion or rapid lube spin-off. The high porosity polyurethane magnetic recording composition of this invention is created by incorporating small quantities of hydrated alumina particles in the polyurethane binder composition. When subjected to an elevated cure temperature, the chemical interaction between the deblocked isocyanate and water molecules released from the hydrated alumina creates volatile gas bubbles that generate the porosity in the magnetic coating surface. The microporosity is created as the isocyanate is deblocked and the hydrated alumina is dehydrated simultaneously. The size of the voids created is controlled by a surface active agent to enable the cured coating surface to retain liquid lubricant while remaining free of magnetic defects.

DETAILED DESCRIPTION

In accordance with this invention, a micro-porous polyurethane magnetic disk coating composition is provided which is adapted for use in coating hard file memory disks. This coating provides a magnetic recording surface of less than one micron thickness which can retain a significant amount of liquid lubricant without spin-off when subject to the high rotational speeds associated with data transfer. The magnetic recording coating of this invention has excellent wear resistance and a small coefficient of friction, therefore, it can be used substantially indefinitely without head crashing at a high velocity and low flying height.

The coating material of this invention is a thermoset polyurethane binder with a small amount polyurea byproduct in which the magnetic particles are dispersed. The principle components of the uncured coating are a blocked polyisocyanate, hydrated alumina particles, a cell size control agent, an oligomer, a surfactant, organo solvents and magnetic particles. The applied coating is cured by evaporating the solvents and heating the coating substrate to a temperature in the ranges of 300° to 400° F. for a time sufficient to cause interaction of the organic components of this coating.

The hydrated alumina and magnetic particles are uniformly dispersed in the solution of blocked polyisocyanate, oligomer, surfactant, and solvents to give a mixture with indefinite storage life at room temperature. Upon heating to 300°–400° F., both the blocked polyisocyanate and hydrated alumina compound are deblocked/dehydrated simultaneously as shown in the following reactions:

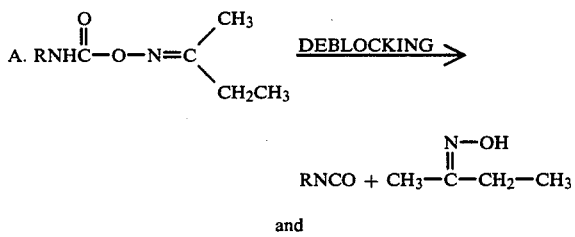

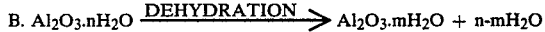

where R is an aromatic, aliphatic or a combination aromatic/aliphatic hydrocarbon chain, and n and m are integers from 1 to 5.

The blocked polyisocyante, as shown at the left side of equation A may dissociate at temperatures above 250° F. regenerating the active polyisocyanate which would then react with the oligomer to give a polyurethane, while the excess polyisocyanate will react with the water molecules released from the hydrated alumina compound to give a volatile $CO_2$ gas and a polyurea by-product. Since, the object of this invention is to provide a micro-porous surface as a less than one micron thick thin film, the timing of the formation of $CO_2$ gas bubbles is critical; that is, under the action of heat comparable to baking temperature (greater than 300° F.), the $CO_2$ gas bubbles must release precisely at the point of the film formation stage.

An interesting property of polyisocyanate chemistry is its ability to react rapidly with water and create volatile gas bubbles as shown in the equation;

$$2RNCO + H_2O \rightarrow RNH-CO-NHR + CO_2$$

This means that addition of water to the coating will produce $CO_2$ gas, yielding pores. However, at current cure conditions, the water molecules are often evaporated before the reaction takes place. To eliminate this technical problem, we have discovered a unique manner of synthesizing a hydrated alumina compound wherein the water molecules are bonded to the aluminum oxide surface and will not evaporate but are reactive. Unlike commercially variable hydrated alumina compounds, this new synthesized material has an average particle size of 0.1 to 1.0 microns and is dispersible in the binder system of the invention.

Hydrated alumina compounds are prepared from an aqueous solution of aluminum salts through a dissolution/precipitation process. The physical properties of hydrated alumina, such as degree of hydration, size and shape of particle structure, activation temperature for dehydration, dispersibility, compatibility, reproducibility, depend on the process conditions of pH, temperature, the rate of mixing, addition, precipitation, and drying. It is important that the size of hydrated alumina particle be as small as possible, preferably less than a micron. It is also important that the particles contain a high degree of hydrating water molecules with bonding energy such that release of the water molecules will be significant at temperatures within the range of 200° to 360° F. Obviously, this hydrated alumina particle must be dispersible in the polyurethane binder of the present invention without causing gellation or agglomeration. All these limitations require the unique process disclosed in this invention.

The aqueous solution of aluminum salts of the present invention is prepared by dissolving aluminum hydroxide with sodium hydroxide in deionized (DI) water or by dissolving any of the aluminum salts as $Al_2(SO_4)_3.18-H_2O$ in DI water at a pH of less than 4 or greater than 9.5. This solution is then injected into a 20 liter tank of water using a minute nozzle opening (size less than 0.5 mm) at the rate of up to 40 ml per minute. The whole solution is thoroughly mixed using a high speed mixer and the pH of the solution is maintained in the range of 4.0 to 9.5 using an acid while the solution is kept at a temperature of 100° to 200° F. Simultaneous with the injection of the aluminum containing solution, an emulsifiable solution containing an organic chelating agent such as organo compound with phosphorus-containing derivatives and water is injected at the rate of 0.025 to 0.1 moles per mole of aluminum salt. The aluminum containing solution and the emulsion are injected into the agitated water in close proximity to the agitator to effect instantaneous intimate contact between the solutions. The organo compound helps control particle size, agglomeration during drying, and compatibility in end use. Upon completion of injection, the pH of the final solution was adjusted within the range of 4 to 9.5 as desired to change the particle surface pH as dictated by end use. A digestion period between the end of injection and this final pH adjustment may be used. After cooling, the product is filtered, washed and dried at an oven temperature of 120° to 220° F. for 18 hours. The white powder was then characterized using a thermogravimetry technique to determine the degree of water hydration and using electron microscopy and light scattering techniques for particle size determination.

The hydrated alumina compound was dispersed to final particle size by using a conventional milling process in the presence of organo solvents or the polyurethane binder as disclosed in the invention, preferably to a size in the range of 0.1 to 0.5 microns.

The blocked polyisocyanate compound used in the binder of the present invention is a methyl-ethyl ketone oxime blocked poly-aromatic or poly-aliphatic or a combination of aromatic/aliphatic isocyanates which have an average molecular weight of 150 to 500 per NCO group. Also this material has at least three reactive sites (NCO groups) per chain so that crosslinking and thermosetting properties are established in the resulting polyurethane binder. The reason for using a methyl-ethyl ketone oxime as blocking agent is to provide "deblocking" when the temperature exceeds 250° F. This deblocking temperature is compatible with the dehydration temperature of the hydrated alumina compounds which are synthesized in accordance with the present of the invention.

The oligomer compounds which are most useful to form the binder are the hydroxyl containing compounds and polymers most often employed in the production of polyurethanes. Examples of such suitable hydroxyl containing compounds are the following, including mixtures thereof: polyoxyalkylene polyols, monomeric polyhydroxyl containing compounds, polyesters of polyhydric alcohols and polycarboxylic acid, lactone polyols and polyacrylic polyols.

The weight ratio of blocked polyisocyanate and oligomer is such that the mole ratio of the isocyanate (NCO) groups present in the blocked polyisocyanate to the hydroxyl (OH) groups present in the oligomer is greater than 1. In general, urethane coatings are formulated to have NCO/OH ratios in the range of 0.8 to 1.2, however, an NCO/OH ratio greater than 0.1 is required in the binder of this invention, since as excess of polyisocyanate is needed to react the water molecules released by the hydrated alumina compound. The NCO/OH ratio of 1.1 to 1.5 is preferred.

The binder of the present invention further contains a surface active agent which reduces the size of the $CO_2$ gas bubbles by lowering the surface contact angles between $CO_2$ gas an liquid binder during the film formation. This provides a cured surface coating with fine, uniform micro-pores that will retain the liquid lubricant without causing magnetic defects. To achieve a defect-free magnetic surface coating, it is important that the size of porosity be smaller than the magnetic bit-cell as demonstrated by the use of a surface active agent in the binder composition of the present invention. It was discovered that silicone oxyethylene copolymers, having an average molecular weight of 150 to 800, are the most efficient surface active agents in producing the best homogenous micro-pores.

The coating further contains one or more additives which operate as a catalyst, dispersant, and/or a surfactant and nonreactive solvents. Catalysts such as organo metal compounds or tertiary amine can be used to promote the reaction between the isocyanate and the oligomer or water molecular to reduce both the curing temperature and time.

The dispersing agent serves to chelate the magnetic particles such that they are individually suspended within the uncured binder to permit the maximum orientation in the desired tangential direction along the disk surface after application of the ink or coating mixture in which the magnetic particles are suspended. The effective dispersants are acrylic, carboxylate polyester, phosphate ester and titanate coupling agents.

The surfactant provides wetting, leveling and flow control functions through reduced surface tension to produce smooth coatings.

Several types of nonreactive solvents can be sued in the production of the present composition to reduce the solids content and enable very thin coatings to be applied to the substrate. Examples of various classes of solvents which may be added to the resins are: aromatic solvents of toluene, xylene, ethylbenzen; ketones of methyl ethyl ketone, isophorone, methyl amyl ketone, ethyl amyl ketone, methyl isobutyl ketone and acetates of ethyl acetate, cellosolve acetate, carbitol acetate, butyl acetate or butyl cellosolve acetate.

The coating composition of this invention is applied to an aluminum substrate using conventional spin coating techniques. The magnetizable particles are then oriented circumferentially on the disk surface using the well established magnetic field orientation techniques following which the coating is cured at an elevated temperature of about 350° F. for approximately 45 minutes. During the curing cycle, the solvents evaporate first, then the deblocking and dehydration respectively of the blocked polyisocyanate and hydrated alumina compounds occur simultaneiously with crosslinking reactions. The surface active agent allows the $C_2$ gas bubbles which are created during the reaction to escape slowly from the surface and form a micro-porous structure. After cooling, the disk is polished to a 0.1 to 0.4 AA surface finish. The polished disk is then washed using deionzed (DI) water and isopropyl alcohol to remove any buffing debris and the finished disk is then lubed using a flurocarbon type lubricant prior to the magnetic test.

The examples that follow detail the method of producing hydrated alumina as a fine particulate having a size of less than one micron with the property that significant hydrating water molecules are released within the temperature range of 200° F. to 360° F. during the time period of cure.

EXAMPLE I

A 20 liter stainless steel container is fitted with a 0.3 mm ID PP injector nozzle in the center of the tank bottom. A mixer is placed over the tip of nozzle and rotated at a constant speed of 10,000 rpm. A total of 9 liters of DI water is added to the tank and heated to 140° F. at an adjusted pH of 9.0 with NaOH solution. With the mixing, 500 grams of NaAl $O_2$ solution is slowly injected into the mixture at the rate of 30 ml per minute (NaAlO$_2$ solution - 500 grams of Al(OH)$_3$, 1030 grams of 50 percent NaOH and 310 grams of DI water). The whole mixture is maintained at a pH range of 8.0 to 8.5, using 1N HCL solution. Simultaneously with the addition of the NaAlO$_2$ solution, an emulsion is injected into the system to control the particle size. This emulsion is a mixture of 40 grams of phosphate ester, Strodex P-100 (Trademark of Dexter Chemical Corporation) with 1200 grams of DI water. The whole mixture is kept at 140° to 150° F. for an hour under high speed agitation. After cooling to room temperature, the solution is adjusted to a final pH of 6.0 The material is then processed by filtering and washing. The final product is dried at 125° F. for 18 hours.

The dry powder is milled to disperse the particles, in the presence of organo solvent such as isophorone, at a powder/solvent ratio of 10 to 90 parts by weight, using a conventional milling technique until the particle size is reduced to less than one micron.

EXAMPLE II

A 20 liter stainless steel container is fitted with a 0.3 mm ID PP injector nozzle in the center of the bottom tank. A mixer is placed over the tip of the nozzle and rotated at a constant speed of 10,000 rpm. A total of 9 liters of DI water is added to the tank, heated to 140° F. and adjusted to a pH of 5.0 using a solution of HCl. WIth mixing, 500 grams of NaAlO$_2$ solution is slowly injected into the mixture at the rate of 30 ml per minute (NaAlO$_2$ solution - 500 grams of Al(OH)$_3$, 1030 grams of 50 percent NaOH, and 310 grams of DI water). The whole mixture is maintained at a pH range of 6.0 to 6.5, using 1N HCL solution. Simultaneously with the addition of the NaAlO$_2$ solution, an emulsion is injected into the system to control particle size. This emulsion is a mixture of 40 grams of phosphate ester, Strodex P-100 (Trademark of Dexter Chemical Corporation) with 1200 grams of DI water. The whole mixture if kept at 140°–150° F. for an hour under high speed agitation. After cooling to room temperature, the solution is adjusted to a final pH of 6.0. The material is then filtered and washed. The final product is dried at 125° F. for 18 hours.

To disperse the particles, the dry powder is milled in the presence of an organo solvent such as isophorone and a binder such as polyester polyol at a pigment to binder ratio of 8 to 1 and 20–40 percent solids by weight, using a conventional milling technique until the particle size reduced to less than one micron.

EXAMPLE III

A 20 liter stainless steel container is fitted with a 0.3 mm ID PP injector nozzle in the center of the bottom tank. A mixer is placed over the tip of the nozzle and rotated at a constant speed of 10,000 rpm. A total of 9 liters of DI water is added to the tank and heated to 140° F. at a pH of 5.0, adjusted using a HCl solution. With mixing, 500 grams of NaAlO$_2$ solution is slowly injected into the mixture at the rate of 30 ml per minute (NaAlO$_2$ solution - 500 grams of Al(OH)$_3$, 1030 grams of 50 percent NaOH, and 310 grams of DI water). The whole mixture is maintained at a ph range of 6.0 to 6.5, using a mixture of 1N HCL and .15N HF solution. Simultaneously with the addition of NaAlO$_2$ solution, an emulsion is injected into the system to control the particle size. This emulsion is a mixture of 40 grams of phosphate ester, Strodex P-100 (Trademark of Dexter Chemical Corporation) with 1200 grams of DI water. The whole mixture is kept at 140° to 150° F. for an hour under a high speed agitation. After cooling to room temperature, the solution is adjusted to a final pH of 6.0 then subjected to the process steps of filtration and washing. The final product is dried at 125° F. for 18 hours.

The hydrated alumina precipitate tends to coagulate into particles that must be milled to reduce or disperse the material to either the original particle size or at least agglomerations having a maximum size below a specified dimension. This hydrated alumina powder is milled to disperse the particles, in the presence of following materials:

| Components | part by weight |
|---|---|
| magnetic particles | 1500 |
| hydrated alumina powder | 51 |
| blocked polyisocyanate (40% in cellosolve acetate) | 164 |
| polyester polyol (75% in xylene) | 192 |
| isophorone | 1100 |
| xylene | 260 |

The mixture is milled using conventional media mill for 20 to 50 minutes cavity residence time. After the milling, the whole mixture is then mixed with 313 grams of 40 percent epoxy solution and 390 grams of 40 percent blocked polyisocyanate, both in isophorone solvent and milled until free of agglomerates. The coating is further diluted to the viscosity of 40 to 60 cps using organo solvents and fluorcarbon surfactant and a surface active agent. The coating is applied to an aluminum disk substrate using conventional spin coating techniques. The coated thickness is less than one micron. After orienting the magnetic particles, the disk is cured at 300° F. for 45 minutes. After cooling, the disk is buffed, washed, and lubed using a flurocarbon type lubricant prior to magnetic test.

On a disk thus prepared, the lube retention of the disk is greater than 1.0 mg per square cm with missing bit defects less than 1000 per surface at 80 pecent clip level.

What is claimed is:

1. A rigid magnetic recording medium having finely divided magnetic particles dispersed in a thermosetting resin binder composition applied as a film having a thickness not exceeding one micron in thickness, closely adhered to a rigid nonmagnetic substrate wherein the coating composition includes 50 to 80 percent by weight of magnetic particles, 20 to 50 percent by weight of binder and comprises finely comminuted hydrated alumina which release a controlled quantity of hydrated water molecules between 200° F. and 360° F. in a concentration of 1% to 5% by weight of magnetic particles;

said binder is formed of a blocked isocyanate that becomes deblocked at a temperature of 250 to 300 degrees F. and an oligomer wherein the NCO-OH ratio is 1.1 to 1.5, an additive for controlling porosity size in the cured binder which comprises 0.5% to 3% by weight of the total binder system; and said coating composition is applied to said substrate and cured at 300 to 400 degrees F. until the cross linking reaction is complete, whereby the cured thermoset coating possesses liquid lubricant retention capability as a high porosity open cell structure wherein the individual voids do not exceed the magnetic bit cell size.

2. The rigid magnetic recording medium of claim 1 wherein said blocked isocyanate is a methyl-ethyl ketone oxime blocked poly-aromatic or poly-aliphatic or a combination of aromatic/aliphatic isocyanates which have an average molecular weight of 150 to 500 per NCO group.

3. The rigid magnetic recording medium of claim 1 wherein said binder additive comprises a surface active agent.

4. The rigid magnetic recording medium of claim 3 wherein said binder additive comprises a silicone oxyethylene copolymer having an average molecular weight of 150 to 800.

5. The rigid magnetic recording medium of claim 1 further comprising a liquid lubricant applied as a film to the surface of the cured coating composition, the majority of which is absorbed into the open cell porous structure of said coating composition.

6. The rigid magnetic recording medium of claim 5 wherein said liquid lubricant is a flurocarbon.

* * * * *

UNITED STATES PATENT AND TRADEMARK OFFICE
CERTIFICATE OF CORRECTION

PATENT NO. : 4,567,096
DATED : Jan. 28, 1986
INVENTOR(S) : Douglas H. Piltingsrud; John C. S. Shen It is certified that error appears in the above—identified patent and that said Letters Patent is hereby corrected as shown below:

On the title page Insert:

-- [73] Assignee: International Business Machines Corporation, Armonk, N.Y.--

Signed and Sealed this

Tenth Day of June 1986

[SEAL]

Attest:

DONALD J. QUIGG

Attesting Officer

Commissioner of Patents and Trademarks